United States Patent [19]

Hammerstrom et al.

[11] Patent Number: 4,918,617
[45] Date of Patent: Apr. 17, 1990

[54] NEURAL-MODEL COMPUTATIONAL SYSTEM WITH MULTI-DIRECTIONALLY OVERLAPPING BROADCAST REGIONS

[75] Inventors: Daniel W. Hammerstrom, Aloha; James L. Bailey, Hillsboro, both of Oreg.

[73] Assignee: Oregon Graduate Center, Beaverton, Oreg.

[21] Appl. No.: 269,422

[22] Filed: Nov. 10, 1988

[51] Int. Cl.⁴ .............................. G06F 15/18
[52] U.S. Cl. .................. 364/513; 364/200; 364/276.6; 364/276.8
[58] Field of Search .......... 364/513, 200, 900

[56] References Cited

U.S. PATENT DOCUMENTS

| | | | |
|---|---|---|---|
| 4,247,892 | 1/1981 | Lawrence | 364/200 |
| 4,347,498 | 8/1982 | Lee et al. | 340/825.02 |
| 4,591,983 | 5/1988 | Bennett et al. | 364/403 |
| 4,622,632 | 11/1986 | Tanimoto et al. | 364/200 |
| 4,644,496 | 2/1987 | Andrews | 364/900 |
| 4,648,044 | 3/1987 | Hardy et al. | 364/513 |
| 4,658,370 | 4/1987 | Erman et al. | 364/513 |
| 4,660,166 | 4/1987 | Hopfield | 364/807 |
| 4,670,848 | 6/1987 | Schramm | 364/513 |
| 4,730,322 | 3/1988 | Pollara-Bozzola | 371/43 |
| 4,731,784 | 3/1988 | Keller et al. | 370/88 |
| 4,739,476 | 4/1988 | Fiduccia | 364/200 |
| 4,796,199 | 1/1989 | Hammerstrom et al. | 364/513 |
| 4,858,147 | 8/1989 | Conwell | 364/513 |

OTHER PUBLICATIONS

A Microprocessor-Based Hypercube Supercomputer; Hayes et al.; IEEE Micro; Oct. 1986; pp. 6-17.

*Primary Examiner*—Allen MacDonald
*Attorney, Agent, or Firm*—Kolisch, Hartwell & Dickinson

[57] ABSTRACT

A neural-model-architectural, layered, multidirectional-feed computational system wherein plural groups of computational (connection) nodes are organized by broadcast bus structures into plural, partially overlapping broadcast regions. This organization allows for selective, simultaneous, multidirectional broadcast communication between the groups of nodes in forward, rearward and lateral overlapping regions.

1 Claim, 1 Drawing Sheet

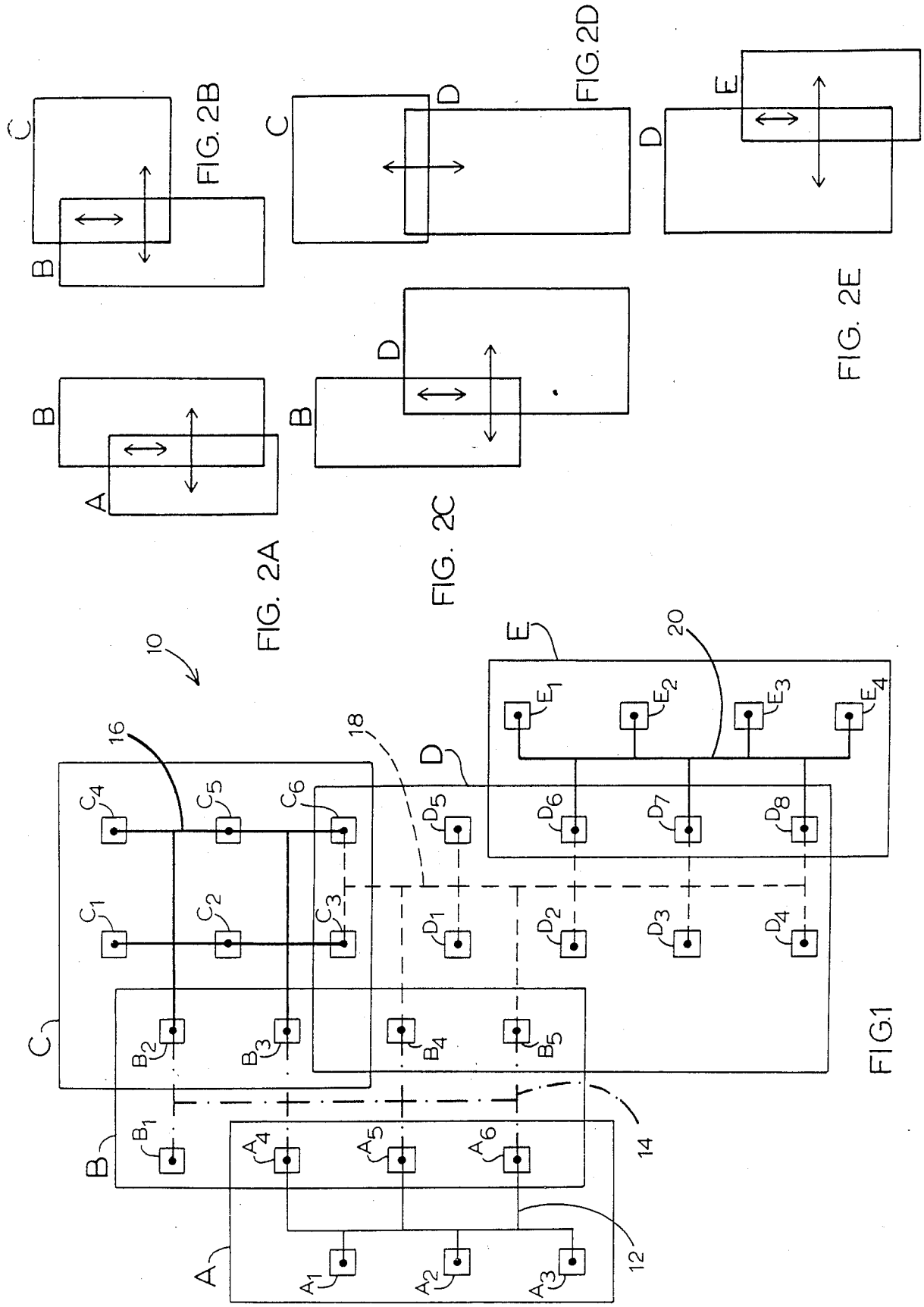

NEURAL-MODEL COMPUTATIONAL SYSTEM WITH MULTI-DIRECTIONALLY OVERLAPPING BROADCAST REGIONS

BACKGROUND AND SUMMARY OF THE INVENTION

This invention pertains to a computational architecture structure, and more particularly to a structure which is based on neural-model connectionism.

Recently, the use of the so-called "connectionist" model has gained popularity as an alternative computational paradigm for artificial intelligence systems that display cognitive behavior. Connectionist models are based on the structure of the brain's neural networks, and because of this, are capable of exhibiting computational behavior which is similar to that of the brain. The most important part of such behavior is the ability to process an input and to reach a conclusion in a few steps, instead of the usual thousands of steps which take place in a typical, sequential computer program.

Connectionist models consist of many simple processors that modify the strengths of their interconnections in order to store data. These processing elements in a connectionist network do not solve a given problem individually. Instead, they compute by being connected appropriately to large numbers of similar units. More specifically, they function by generating, in parallel, multiple competing hypotheses, and by then relaxing to a single, best-match interpretation.

In the system disclosed herein, two types of processors are involved. One of these is referred to as a connection node which is a virtual element rather than a physical element. A connection node performs as a simple computing "center". The particular function that is computed by a connection node is dependent on the particular connectionist model that has been selected. Implementation of the present invention is in no way dependent upon this selected function, and accordingly, no function discussion is included in the text which follows.

The other kind of processor is referred to as a physical node, which is a physical element. A physical node takes the form of an independent processor which is capable of performing standard arithmetic and logical computations.

Directly associated with each physical node are plural connection nodes. Stated more precisely, each physical node "creates" its associated connection nodes through using data stored within a memory structure which also forms part of the physical node.

In a prior-filed patent application covering an invention by us, filed Feb. 24, 1987 Ser. No. 017,788 for NEURAL-MODEL, INFORMATION-HANDLING ARCHITECTURE AND METHOD, where a broadcast-hierarchical, neural-model connectionist architecture structure and method are disclosed. This particular architecture structure has special utility in circumstances where a correct assumption exists that long connections are used for communication less frequently than short connections. In such a setting, characterizable as "temporal locality", the structure there described most efficiently handles computational activity.

In other kinds of situations where substantially all connections are used very frequently with few long connections made, "spatial locality", another kind of architecture structure is best suited to maximize computational efficiency.

A principal object of the present invention is to provide a unique architecture structure which deals with the "spatial locality" type situation just mentioned and which organizes and employs physical nodes and connection nodes in a manner that tends to maximize certain capabilities and advantages of a neural-model, connectionist, computational network.

According to a preferred embodiment of the invention, what is proposed herein is an organization which is characterized by plural, layered groups of connection nodes collected in what are referred to herein as broadcast regions. These broadcast regions overlap in a rearward and backward sense, and also in a lateral sense. The broadcast regions are, in fact, defined by broadcast bus structures which are specific to their respective associated regions.

This kind of an organization, unique in the field of neural-model connectionist architecture, offers, for a given physical territory and number of connection nodes, a vast number of communication (connection) possibilities in a very short span of time.

Various other features and advantages which are offered by the system of the present invention will become more fully apparent as the description which now follows is read in conjunction with the drawings.

DESCRIPTION OF THE DRAWINGS

FIG. 1 is a schematic illustration of a neural-model computational system constructed in accordance with the present invention.

FIGS. 2A–2E, inclusive, are views illustrating certain communication relationships which exist between the several, overlapping (layered) broadcast regions that are depicted in FIG. 1.

DETAILED DESCRIPTION OF THE INVENTION

Turning now to the drawings, and referring first of all of FIG. 1, indicated generally at 10 is a computational system which is organized in accordance with the special features of the present invention. In the particular system now illustrated, the same includes five overlapping (layered) broadcast regions which are designated as A, B, C, D and E.

Pictured in each of these five broadcast regions are plural rectangles, each of which represents a collection of connection nodes associated with a single physical node. For the purpose of explaining the invention, it is not important to know how many connection nodes are associated with each physical node. Suffice to say that it can be a very large number, for example, 1,000 or more. The physical node for a given collection of associated connection nodes acts as a sort of communication center which allows each node, through broadcasting, utilizing a specific identifying, "come-from" address which has been assigned to each, to communicate with every other connection node in its broadcast region which is intended to "listen" to broadcasts from that node. "Come-from" address broadcast communication is discussed in great detail in the above referred-to prior-filed U.S. Patent Application. The disclosure of that application is hereby incorporated by reference into this application.

Thus, and continuing attention on FIG. 1, broadcast region A is shown to include six such rectangles $A_1$–$A_6$, inclusive; region B, eight such rectangles including $A_4$, $A_5$, $A_6$ and in addition $B_1$–$B_5$, inclusive; region C, eight such rectangles including $B_2$ and $B_3$, and in addition, $C_1$–$C_6$, inclusive; region D, twelve such rectangles including $B_4$, $B_5$, $C_3$, $C_6$, and in addition, $D_1$–$D_8$, inclusive; and region E seven such rectangles including $D_6$–$D_8$, inclusive, and in addition, $E_1$–$E_4$, inclusive.

These broadcast regions are defined, in effect, by broadcast communication buses 12, 14, 16, 18, 20 which are associated, respectively, with regions A, B, C, D, E. Bus 12 is connected to each of the physical nodes in region A, bus 14 to each of the physical nodes in region B, bus 16 to each of the physical nodes in region C, bus 18 to each of the physical nodes in region D, and bus 20 to each of the physical nodes in region E.

In terms of the directions (forward, rearward and lateral) in which broadcast communication can take place, forward is in the upward direction in FIG. 1, rearward in the downward direction, and lateral to the left or to the right in FIG. 1.

Considering FIGS. 2A–2E, inclusive, along with FIG. 1, regions AB (FIG. 2A) overlap one another in both lateral and forward and rearward directions, and the same can be seen to be true with respect to regions BC (FIG. 2B), BD (FIG. 2C) and DE (FIG. 2E). Regions CD (FIG. 2D) overlap one another in a forward and rearward directions.

Suitable control circuitry (not shown) controls connection-node access to the associated broadcast bus to ensure that only one connection node in a broadcast region at any given time can seize control of the bus.

Thus, a novel system is proposed. It is the lateral and forward and rearward overlapping (layering) of broadcast regions which promotes the kind of sophisticated, high-volume, high-speed communication capacity which is offered by this unique organization.

Considering one of the powerful features of the present invention, it is uniquely suited to handle situations where what might be thought of as communication neighborhoods (plural) are identified by employing overlapping, broadcast regions, each, for example, handling a different given one of such neighborhoods, major time-saving communication efficiency is realized. Spatially mapping such broadcast regions to such neighborhoods avoids the problem of communication in one neighborhood "holding up" communication in another—a situation which would exist if both shared the same broadcast-region bus.

We believe that, by reviewing the disclosure which has just been made of this system, those skilled in the art will readily appreciate the enhanced communication capabilities offered by what is shown.

Accordingly, while a preferred embodiment of the invention has been described herein, it is appreciated that variations and modifications may be made without departing from the spirit of the invention.

It is claimed and desired to secure by Letters Patent:

1. A neural-model-architectural, layered, multi-directional-feed computational system comprising plural groups of computational (connection) nodes, and;

bus means operatively associated with said groups organizing the same into plural, partially overlapping broadcast regions allowing selective, simultaneous, multi-directional broadcast communication between the nodes in forward, rearward and lateral overlapping regions.

* * * * *